(12) United States Patent
Ohtsu et al.

(10) Patent No.: US 7,216,723 B2
(45) Date of Patent: May 15, 2007

(54) PULSE TORQUE GENERATOR AND POWER TOOL HAVING THE SAME

(75) Inventors: Shinki Ohtsu, Hitachinaka (JP); Chikai Yoshimizu, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 11/319,173

(22) Filed: Dec. 28, 2005

(65) Prior Publication Data
US 2006/0137887 A1    Jun. 29, 2006

(30) Foreign Application Priority Data
Dec. 28, 2004   (JP) ............................. P2004-381604

(51) Int. Cl.
*B25B 21/02* (2006.01)
(52) U.S. Cl. .................... 173/2; 173/93; 173/117; 192/21.5; 81/473; 310/23
(58) Field of Classification Search ............... 173/2, 173/93, 93.5, 117, 213, 176; 192/21.5, 103 F; 188/267.1; 310/12, 14, 23; 81/473; 477/13; 464/29, 180
See application file for complete search history.

(56) References Cited

U.S. PATENT DOCUMENTS

| | | | |
|---|---|---|---|
| 2,687,054 A * | 8/1954 | Nelson ........................ | 81/473 |
| 2,762,248 A | 9/1956 | Nalson | |
| 3,150,725 A | 9/1964 | Homschuch | |
| 4,896,754 A * | 1/1990 | Carlson et al. ............ | 192/21.5 |
| 5,845,718 A * | 12/1998 | Cooper et al. .............. | 173/176 |
| 5,845,753 A * | 12/1998 | Bansbach .................... | 192/21.5 |
| 6,302,249 B1 * | 10/2001 | Jolly et al. .................... | 188/269 |
| 6,311,786 B1 * | 11/2001 | Giardino et al. ............... | 173/1 |
| 6,568,470 B2 * | 5/2003 | Goodson et al. ........... | 166/66.5 |
| 6,606,922 B2 * | 8/2003 | Case et al. ................... | 464/180 |
| 6,695,070 B1 * | 2/2004 | Gokturk et al. ................ | 173/1 |
| 6,841,910 B2 * | 1/2005 | Gery .......................... | 310/103 |
| 6,918,449 B2 * | 7/2005 | Shinagawa et al. ............ | 173/2 |
| 6,942,081 B2 * | 9/2005 | Wen et al. .................. | 192/21.5 |

FOREIGN PATENT DOCUMENTS

| | | |
|---|---|---|
| EP | 1 462 219 | 9/2004 |
| FR | 1 079 214 | 11/1954 |
| FR | 1 187 157 | 9/1959 |
| JP | 2001-88050 | 4/2001 |
| WO | WO 2004-012910 | 2/2004 |

* cited by examiner

*Primary Examiner*—Scott A. Smith
(74) *Attorney, Agent, or Firm*—Antonelli, Terry, Stout & Kraus, LLP.

(57) ABSTRACT

A pulse torque generator utilizing a magnetic coupling, and an electric power tool provided with the pulse torque generator. The pulse torque generator includes an input shaft extending in its axial direction and having a hollow section providing a hollow space, and an output shaft rotatably provided in the hollow space. A magnetic fluid is encapsulated in a hollow space between the input shaft and output shaft. A magnetic field generating unit is disposed, and magnetic segments are provided in the input shaft. A magnetic fluid provides a magnetic fluid bridge bridging between the input shaft and the output shaft each time the magnetic segment is brought into confrontation with the magnetic field generating unit.

20 Claims, 9 Drawing Sheets

PULSE TORQUE GENERATOR AND POWER TOOL HAVING THE SAME

BACKGROUND OF THE INVENTION

The present invention relates to a pulse torque generator available for an electric power tool such as an electric impact driver, and to such power tool provided with the pulse torque generator.

The pulse torque generator has an output shaft or a spindle intermittently driven in a predetermined cycles, so that a driver attached to the spindle is cyclically or pulsatingly rotated for fastening a screw. An oil-pulse type impact driver is described in Japanese Patent Application Laid-Open Publication No. 2001-88050 in which oil-compression is utilized for generating a torque to eliminate metal striking noise. Thus, the oil-pulse type impact driver has been manufactured as a low-noise power tool However, in the disclosed oil-pulse type impact driver, a pulse torque is reduced if oil leakage occurs. To avoid this problem, a seal structure is required in the impact driver in order to avoid oil leakage, which complicates the structure of the impact driver and increases the size of the impact driver itself.

SUMMARY OF THE INVENTION

It is therefore, an object of the present invention to overcome the above-described drawbacks and to provide a pulse torque generator and a power tool equipped with the same having a simple and compact structure.

This and other objects of the present invention will be attained by a pulse torque generator including an input shaft, an output shaft, a magnetic fluid, and at least one magnetic field generating unit. The input shaft is connected to a drive source and is rotatable about its axis. The input shaft is provided with a hollow section extending in an axial direction of the input shaft and including at least one magnetic section and at least one non magnetic section. The hollow section provides a hollow space. The output shaft rotatably extends through the hollow space. An annular gap is defined between the inner peripheral surface of the input shaft and the outer peripheral surface of the output shaft. The magnetic fluid is encapsulated in the annular gap. The at least one magnetic field generating unit is disposed at a radially outside of the hollow section. The magnetic section and the non-magnetic section are alternately confrontable with the magnetic field generating unit by the rotation of the input shaft. The magnetic fluid provides a magnetic bridge bridging between the input shaft and the output shaft each time the magnetic section is brought into confrontation with the magnetic field generating unit for pulsatingly transmitting rotation of the input shaft to the output shaft through the magnetic fluid bridge. In another aspect of the invention, there is provided a power tool including a casing, a drive source disposed in the casing, the input shaft, the output, the magnetic fluid, and the at least one magnetic field generating unit.

In still another aspect of the invention, there is provided a pulse torque generator including an input shaft, an output shaft, a magnetic fluid, at least one magnetic field generating unit, and at least one pair of magnetic members. The input shaft is connected to a drive source and is rotatable about its axis. The input shaft is provided with a hollow section extending in an axial direction of the input shaft. The hollow section provides a hollow space. The output shaft rotatably extends through the hollow space. An annular gap is defined between the inner peripheral surface of the input shaft and an outer peripheral surface of the output shaft. The magnetic fluid is encapsulated in the annular gap. The at least one magnetic field generating unit is disposed at one of the inner peripheral surface of the input shaft and the outer peripheral surface of the output shaft. The at least one pair of magnetic members are disposed to interpose the at least one magnetic field generating unit between the pair of magnetic members. The magnetic fluid provides a magnetic bridge bridging between the input shaft and the output shaft each time a distance between the input shaft and the output shaft becomes minimum for pulsatingly transmitting rotation of the input shaft to the output shaft through the magnetic fluid bridge. In still another aspect of the invention there is provided a power tool including a casing, a drive source disposed in the casing, the input shaft, the output shaft, the magnetic fluid, the at least one magnetic field generating unit, and the at least one pair of magnetic members.

BRIEF DESCRIPTION OF THE DRAWINGS

In the drawings:

FIG. 4(a) through 4(d) are explanatory cross-sectional view showing the principle of the pulse torque generator according to the first embodiment, and FIG. 4(a) shows a state where an input shaft is at zero degree angular rotational position;

DETAILED DESCRIPTION OF THE PREFERRED EMBODIMENTS

An electrical power tool incorporating a pulse torque generator according to a first embodiment of the present invention will be described with reference to FIGS. 1 through 5. The power tool is an impact driver 1.

Figure 1:
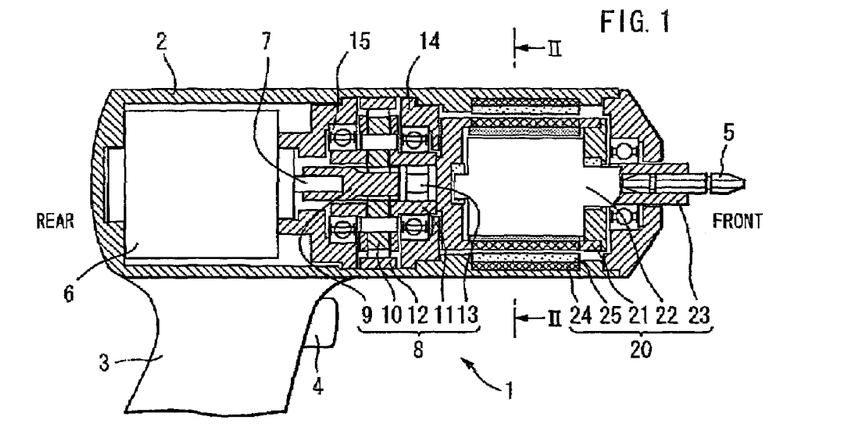
FIG. 1 is a cross-sectional view showing an impact driver incorporating a pulse torque generator according to a first embodiment of the present invention.

The impact driver 1 includes a casing 2 and a handle 3 attached to a rear side of the casing 2. A trigger switch 4 is provided at a front side of the handle 3, and a bit 5 extends from a front side of the casing 2. Throughout the specification, the bit side will be referred to a front side, and the handle side will be referred to a rear side.

In the casing 2, a drive motor 6, a planetary gear mechanism 8 driven by the drive motor 6, and a pulse torque generator 20 selectively driven by the planetary gear mechanism 8 are provided. The drive motor 6 having a motor shaft 7 is supported in the rear side of the casing 2. The trigger switch 4 is adapted for energizing and de-energizing the motor 6.

The planetary gear mechanism 8 includes a sun gear 9, planetary gears 10, a ring gear 12, and a center shaft 13. The sun gear 9 is fixedly mounted to a tip end of the motor shaft 7. The planetary gears 10 are meshedly engaged with the sun gear 9, and a sleeve like orbit shaft 11 is connected to the planetary gears 10. The orbit shaft 11 has a flange portion at which rotation shafts of the planetary gears 10 are rotatably supported. The ring gear 12 is fixed to an inner peripheral surface of the casing 2 and is meshedly engaged with the planetary gear 10. The center shaft 13 is concentrically fixed to the orbit shaft 11. A gear holder 14 is provided for supporting bearings 15 which rotatably supports the orbit shaft 11.

The pulse torque generator 20 includes an input shaft 21 and an output shaft 22. The input shaft 21 is coaxial with and integral with the center shaft 13. Therefore, the input shaft 12 is rotable at a constant speed about its axis upon rotation of the drive motor 6 through the planetary gear mechanism 8. The output shaft 22 has a front side provided with a bit holder 23 to which the bit 5 is detachably assembled. By the rotation of the input shaft 21, the output shaft 22 is pulsatingly or cyclically rotated about its axis so as to pulsatingly rotate the bit 5.

Figures 2, 3:
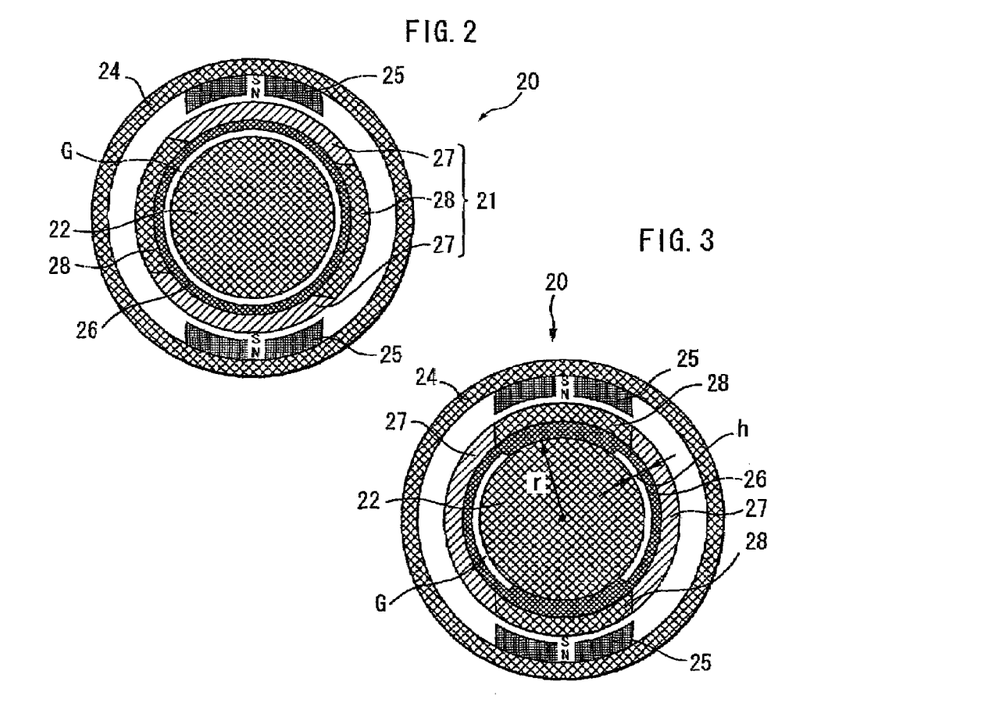
FIG. 2 is a cross-sectional view showing the pulse torque generator and taken along the line II—II in FIG. 1 and showing a state where a torque is not generated.
FIG. 3 is a cross-sectional view showing the pulse torque generator and taken along the line II—II in FIG. 1 and showing a state where a pulse torque generation has been enabled.

Next, details of the pulse torque generator 20 will be described. The pulse torque generator 20 includes the above-described input shaft 21, the output shaft 22, an outer sleeve 24, two permanent magnets 25, and a magnetic liquid 26. The outer sleeve 24 is fixed to an inner peripheral surface of the casing 2, and is formed of a magnetic material. The permanent magnets 25 are fixed to the inner peripheral surface of the outer sleeve 24 and function as magnetic field generation unit. These permanent magnets 25 are positioned at diametrically opposite side of the outer sleeve 24, and at identical axial position of the outer sleeve 24.

The input shaft 21 is rotatably supported at a position inside the outer sleeve 24 and has a sleeve portion providing a hollow cylindrical space. The sleeve portion includes a pair of non-magnetic sections 27 disposed at diametrically opposite side to each other, and a pair of magnetic sections 28 disposed at diametrically opposite side to each other and arrayed alternately with the non-magnetic section 27 in the circumferential direction of the sleeve portion. The output shaft 22 is rotatably supported in the sleeve portion. An annular sleeve G is defined between the sleeve portion of the input shaft 21 and output shaft 22. The magnetic liquid 26 is encapsulated in the gap G.

FIG. 2 shows a state where the rotation of the input shaft 21 is not transmitted to the output shaft 22. That is, portions of the input shaft 21 that face the permanent magnets 12 are the non-magnetic section 27, so that the magnetic force acting on the magnetic liquid 26 is insufficiently small. Accordingly, the magnetic liquid 26 is distributed along the inner peripheral surface of the sleeve portion of the input shaft 21 by virtue of centrifugal force. Thus, a continuous annular gap exists between the sleeve portion of the input shaft 21 and output shaft 22. As a result, the rotation of the input shaft 21 is not transmitted to the output shaft 22.

FIG. 3 shows a state where the rotation of the input shaft 21 is transmitted to the output shaft 22. That is, the magnetic sections 28 of the input shaft 21 are brought into confrontation with the permanent magnets 25, so that the magnetic force acting on the magnetic liquid 26 is increased to allow the magnetic liquid 26 to be bridged between the sleeve portion of the input shaft 21 and output shaft 22. As a result, the rotation of the input shaft 21 is transmitted to the output shaft 22 through the magnetic liquid 26 to provide a magnetic coupling. Therefore, each time the magnetic sections 28 of the input shaft 21 reach the angular positions that face the permanent magnets 25, the output shaft 22 is angularly rotated in a pulse-like manner by the rotational force transmitted through the magnetic liquid 26.

Figure 4A:
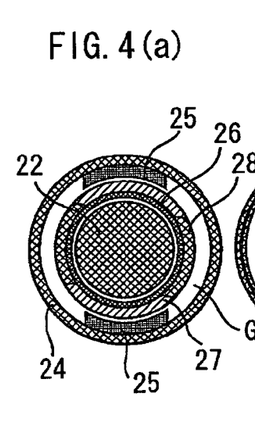
Figure 4B:
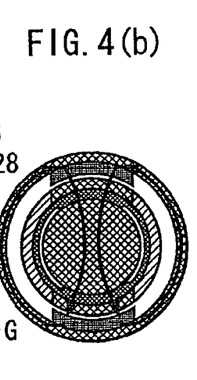
FIG. 4(b) shows a state where the input shaft is at 90 degrees angular rotational position.
Figure 4C:
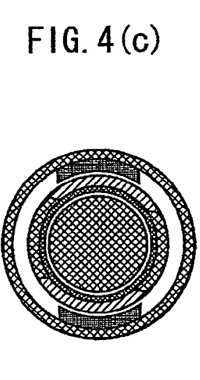
FIG. 4(c) shows a state where the input shaft is at 180 degrees angular rotational position.
Figure 4D:
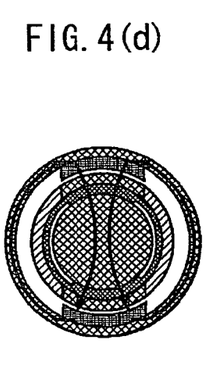
FIG. 4(d) shows a state where the input shaft is at 270 degrees angular rotational position.
Figure 5:
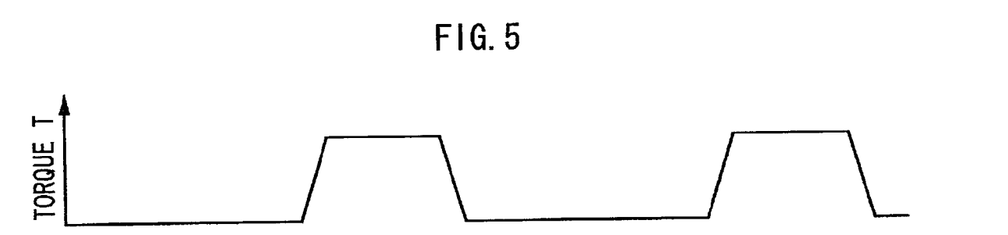
FIG. 5 is a diagram showing a waveform of the pulse of FIG. 4.

That is, as shown in FIGS. 4(a) through 5, the output shaft 22 is rotated at predetermined time intervals and generates two torque pulses every time the input shaft 21 is rotated by 360 degrees. Assuming that the rotation speed of the input shaft 21 is 3000 and 600 rpm, the predetermined time interval is 0.01 and 0.05 sec., respectively. Incidentally, the input shaft 21 and output shaft 22 are rotated in clockwise direction. In FIGS. 4(a) through 4(d), arrows imply flows of magnetic flux.

A torque generated at the output shaft 17 will be described. Assuming that the rotation speed of the input shaft 21 is n(rps), a radial distance between the inner peripheral surface of the input shaft 21 and the outer peripheral surface of the output shaft 22 is h(m), average radius of the space portion is r(m), viscosity coefficient of the magnetic liquid 26 is a(Pa·s), and a contact area of the magnetic liquid 26 with respect to the input shaft 21 and output shaft 22 is S(m$^2$), the velocity gradient (dV/dh) of the magnetic liquid 26 is represented by $$dV/dh=2\pi*r*(n/h)(1/s) \quad (1)$$

and the viscous force P of the magnetic liquid 26 is represented by $$P=a*(dV/dh)*S(N) \quad (2)$$

so that, the torque T is represented by $$T=r*P(Nm) \quad (3)$$

Here, "r" represents a distance between an axis of the output shaft 22 and a radially intermediate position of the bridged portion of the magnetic liquid 26 as shown in FIG. 3. As is apparent from the above equations, by increasing the contact area "S", average radius "r" of the space portions and viscosity coefficient "a" of the magnetic liquid 26 and reducing the distance "h", a large torque T can be generated.

Figure 6:
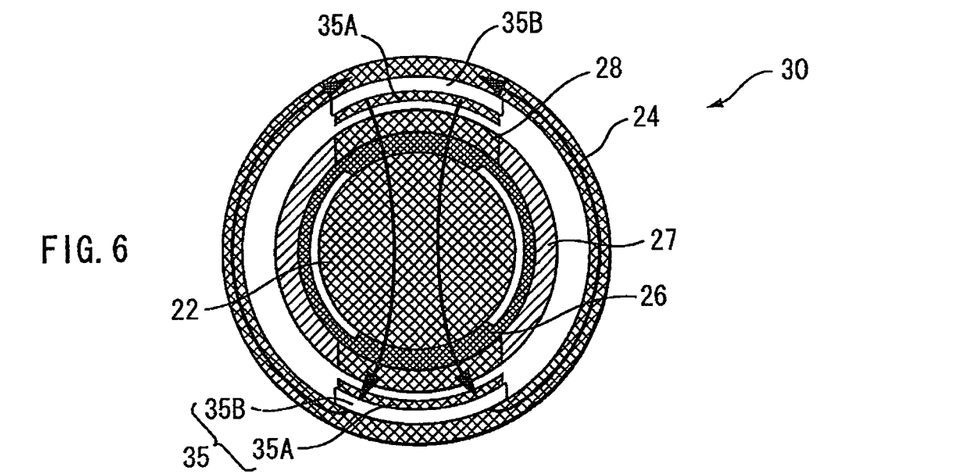
FIG. 6 is a cross-sectional view showing a pulse torque generator according to a second embodiment of the present invention.

FIG. 6 shows a pulse torque generator 30 according to a second embodiment of the present invention wherein like parts and components are designated by the same reference numerals as those shown in FIGS. 1 through 5. The second embodiment is almost the same as the first embodiment except the magnetic field generating unit 35. That is, in the second embodiment, an electromagnet 35A having a coil 35B is used instead of the permanent magnet 25 of the first embodiment to form the magnetic field generation unit 35. With this arrangement, an exciting current can be constantly applied to the coil 35B to constantly excite the coil 35B. Alternatively, the coil 35B can be intermittently excited each time the magnetic sections 28 are brought into confrontation with the electromagnet 35B, that is, at predetermined time intervals. Further alternatively, a sensor (not shown) may be provided to detect an angular rotational position of the input shaft 21 so as to excite the coil 35B in timed relation to the detection. With this arrangement, energy saving is achievable. Moreover, exciting current level to be applied to the coil 35B can be controlled in order to control magnitude of the torque that the output shaft 22 generates.

Figure 7:
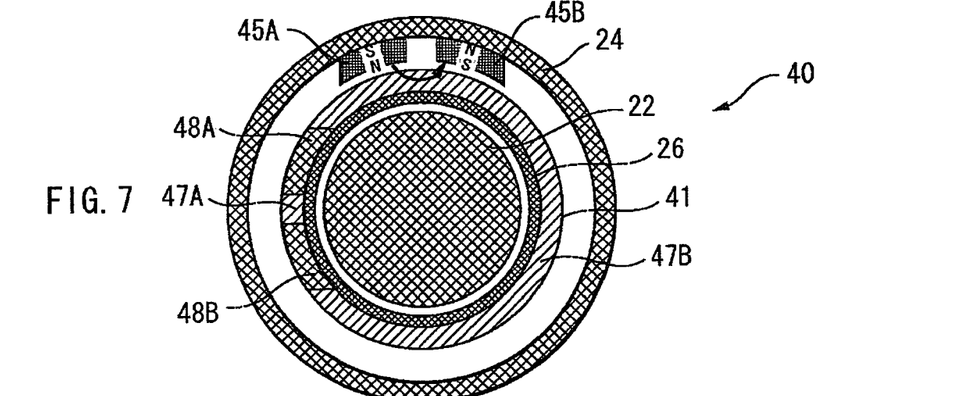
FIG. 7 is a cross-sectional view showing a pulse torque generator according to a third embodiment of the present invention, and showing a state where a torque is not generated.

A pulse torque generator according to a third embodiment of the present invention is shown in FIGS. 6 and 7. In the third embodiment, one torque is generated each time the input shaft 21 is rotated by 360 degrees. Two permanent magnets 45A and 45B having different polarities from each other are arranged along the circumferential direction and are positioned side by side. Further, an input shaft 41 includes two magnetic sections 48A and 48B, a non-magnetic section 47A interposed therebetween, and another non magnetic section 47B. The magnetic sections 48A and 48B are confrontable with the permanent magnets 45A and 45B respectively at a specific rotation angle of the input shaft 41.

Figure 8:
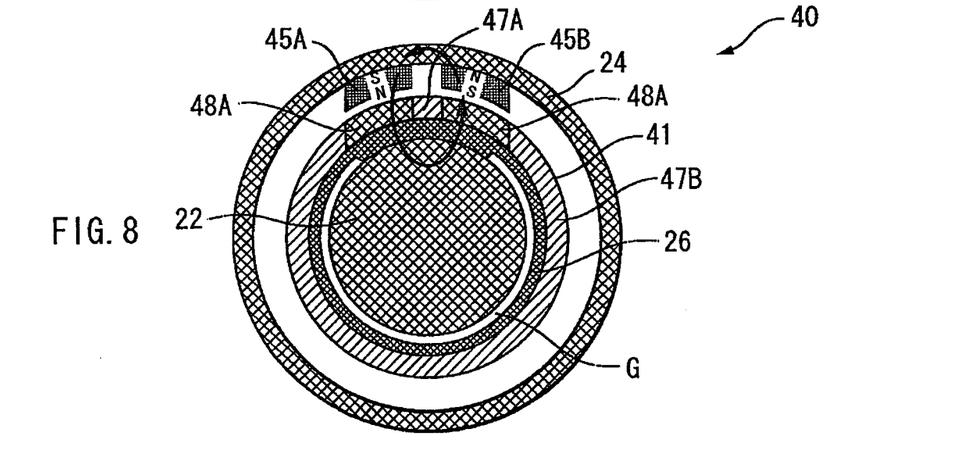
FIG. 8 is a cross-sectional view showing the pulse torque generator according to the third embodiment, and showing a state where a pulse torque generation has been enabled.

With this arrangement, one torque is generated every time the input shaft 41 is rotated by 360 degrees, so that a single peak torque is twice as large as that in the case where two torque peaks are generated every one rotation of the input shaft, although an average torque is the same between the two cases.

A modification is conceivable in the third embodiment such that although the two permanent magnets 45A and 45B are spaced apart in the circumferential direction, they may be spaced apart in the axial direction of the outer sleeve 24. Further, another magnetic material can be used in place of one of the permanent magnets.

Figure 9:
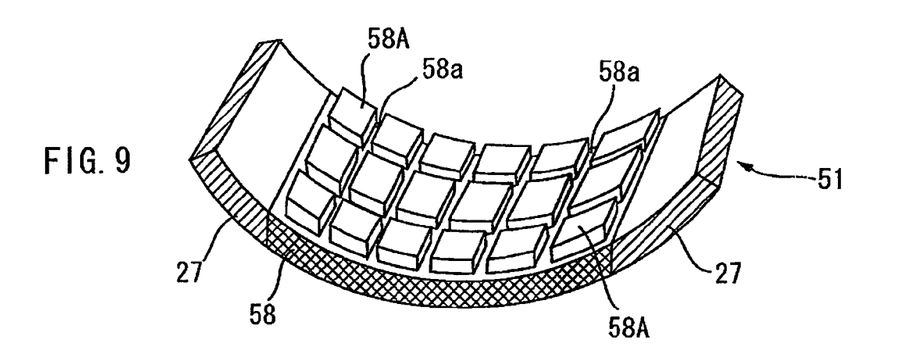
FIG. 9 is a partial perspective view showing an inner peripheral side of the input shaft in a pulse torque generator according to a fourth embodiment of the present invention.
Figure 10:
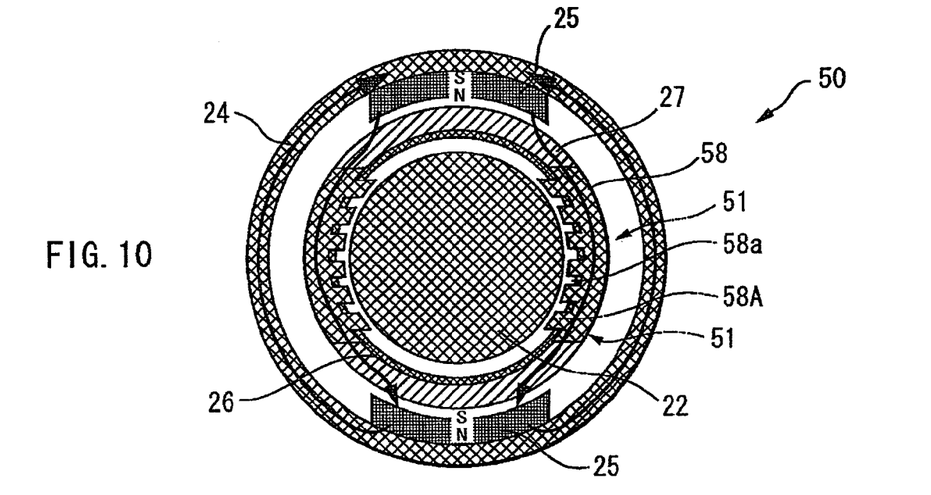
FIG. 10 is a cross-sectional view showing the pulse torque generator according to the fourth embodiment, and showing a state where a torque is not generated.
Figure 11:
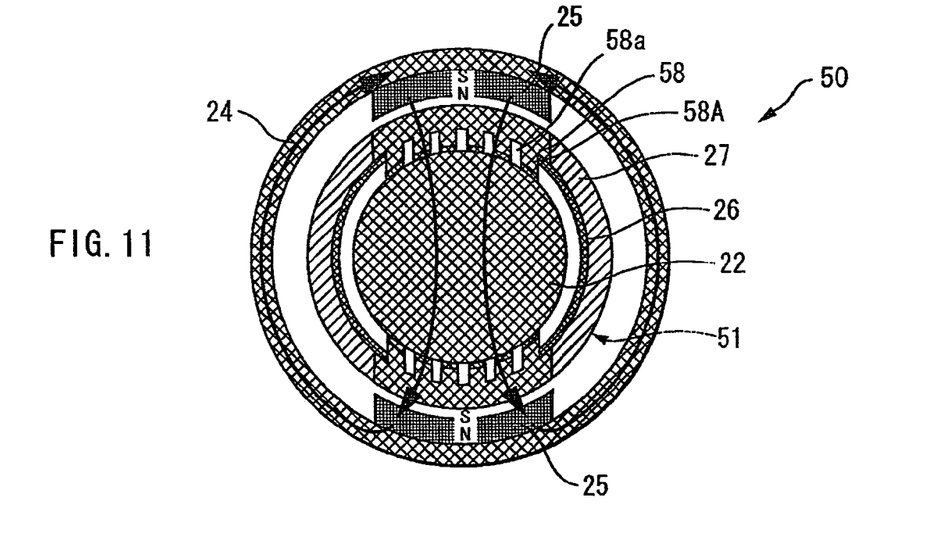
FIG. 11 is a cross-sectional view showing the pulse torque generator according to the fourth embodiment, and showing a state where a pulse torque generation has been enabled.

A pulse torque generator according to a fourth embodiment of the present invention is shown in FIGS. 9 through 11. In the fourth embodiment, an input shaft 58 includes the non magnetic sections 27 and magnetic sections 58 whose inner peripheral surfaces are formed with a plurality of convex portions 58A and concave portions 58a. Since the magnetic liquid 26 can be entered into the concave portions 58a, a radial distance between each free end of each convex portion 58A and the outer peripheral surface of the output shaft 22 can be reduced to 1 mm or less. Consequently, a torque to be generated can be increased.

Figures 12, 13, 14:
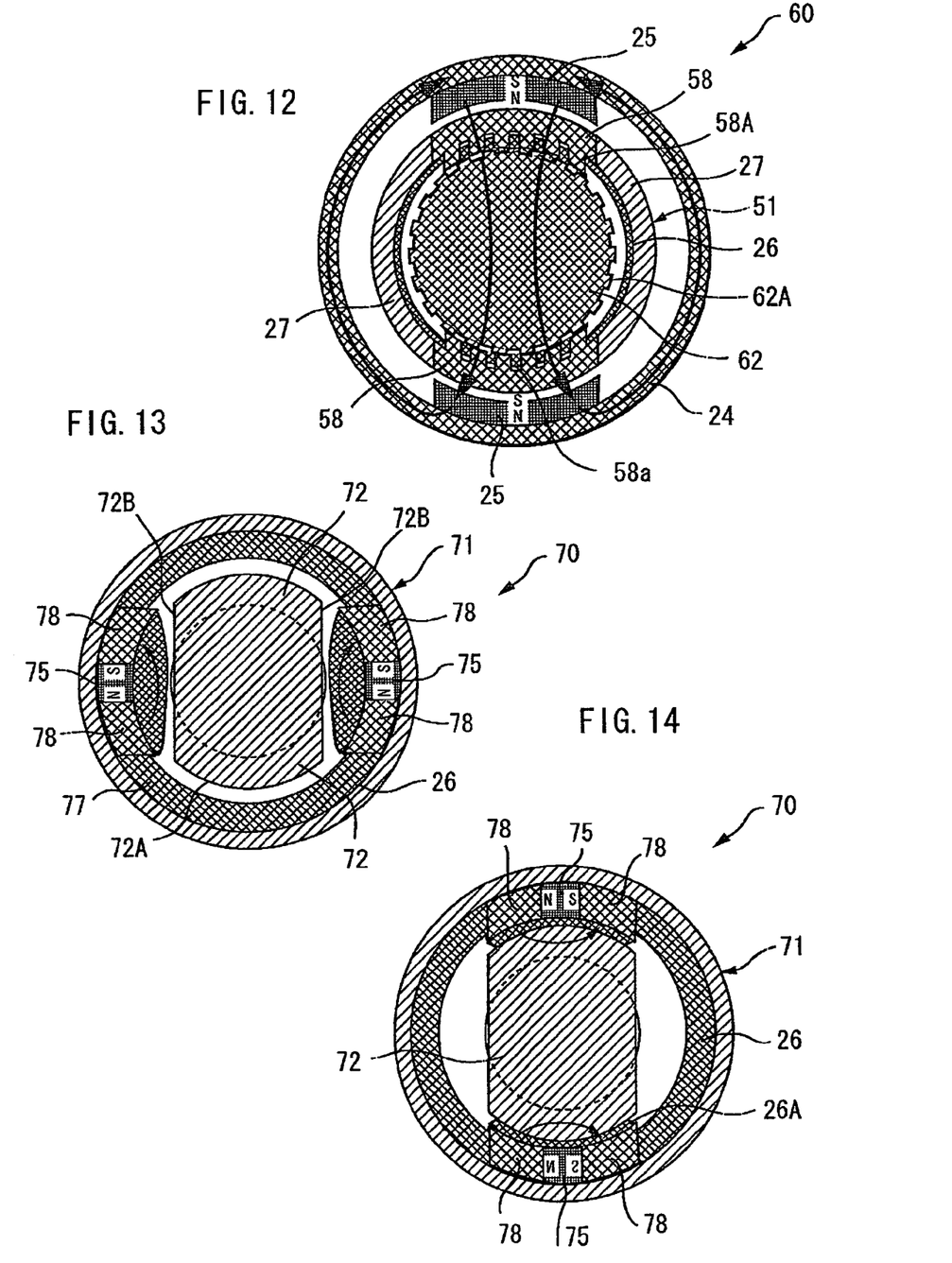
FIG. 12 is a cross-sectional view showing a pulse torque generator according to a fifth embodiment of the present invention, and showing a state where a pulse torque generation has been enabled.
FIG. 13 is a cross-sectional view showing a pulse torque generator according to a sixth embodiment of the present invention, and showing a state where a torque is not generated.
FIG. 14 is a cross-sectional view showing the pulse torque generator according to the sixth embodiment, and showing a state where a pulse torque generation has been enabled.

A pulse torque generator according to a fifth embodiment of the present invention is shown in FIG. 12, which is an improvement on the fourth embodiment. That is, in the fifth embodiment, an output shaft 62 is modified such that a plurality of convex portions 62A are arrayed in the circumferential direction of an output shaft 62. These convex portions 62A protrude radially outwardly from the outer peripheral surface of the output shaft 62 and extends in axial direction thereof. Each time the convex portions 58A of the input shaft 51 are moved past the convex portions 62A of the output shaft 62 corresponding parts of the magnetic liquid 26 collides against the side walls of these convex portions to generate vortex. The vortex serves as a flow resistance and a viscous force of the magnetic liquid 26 can be apparently increased. As a result, a large torque can be generated.

A pulse torque generator according to a sixth embodiment of the present invention is shown in FIGS. 13 and 14. In the foregoing embodiments, the magnetic field generating unit such as permanent magnet 25 and electromagnet 35A are provided at the outer sleeve 24. On the other hand, in the sixth embodiment, the outer sleeve 24 is dispensed with, and a pair of permanent magnets 75 are disposed at an inner peripheral surface of an input shaft 71 at diametrically opposite sides to each other.

More specifically, the input shaft 71 includes a non-magnetic sleeve section 77, and four magnetic sections 78. The permanent magnets 75 and the magnetic sections 78 are disposed at the inner peripheral surface of the non-magnetic sleeve section 77 such that a pair of magnetic sections 78 interpose therebetween a single permanent magnet 75 in a circumferential direction of the sleeve section 77. A combination of the pair of magnetic sections 78 and permanent magnet 75 provides an arcuate inner peripheral surface whose imaginary center is coincident with an axis of the non-magnetic sleeve section 77.

An output shaft 72 provides a pair of arcuate surfaces 72A symmetrical to each other with respect to the axis of output shaft 72, and a pair of flat surfaces 72B also symmetrical to each other with respect thereto. The arcuate surfaces have imaginary center coincident with the axis of the output shaft 72 and the input shaft 71.

FIG. 13 shows magnetically de-coupling state where the magnetic sections 78 and the permanent magnet 75 are in confrontation with the flat surface 72B. In this state, a sufficiently large space is provided between the permanent magnets 75 and the flat surface 72B of the output shaft 72, so that magnetic field acting on the magnetic liquid 26 is small. Thus, a magnetic liquid cannot be bridged between the permanent magnets 75 and the flat surface 72B. Consequently, the rotation of the permanent magnets 75 that is, the rotation of the input shaft 71 is not transmitted to the output shaft 72.

FIG. 14 shows a magnetically coupling state where the magnetic sections 78 and the permanent magnet 75 are in confrontation with the arcuate surface 72A. In this state, a distance between the permanent magnet 75 and the arcuate surface 72A is sufficiently small to allow the magnetic liquid 26 to be bridged between the input shaft 71 and the output shaft 72 as represented by the reference numeral 26A. As a result, the rotation of the input shaft 71 can be transmitted to the output shaft 72. That is, the output shaft 72 generates two torque peaks in a pulse-like manner each time the input shaft 213 is rotated by 360 degrees.

A pulse torque generator according to a seventh embodiment of the present invention is shown in FIGS. 15 through 19. The seventh embodiment is closely related to the sixth embodiment in that the outer sleeve 24 is dispensed with, and permanent magnets 85 are disposed at an inner peripheral surface of an input shaft 81. The input shaft 81 is generally cup shaped configuration, and has an open end covered with an end cap 81A through a seal member (not shown). The end cap 81A is formed with a central opening.

Figure 15:
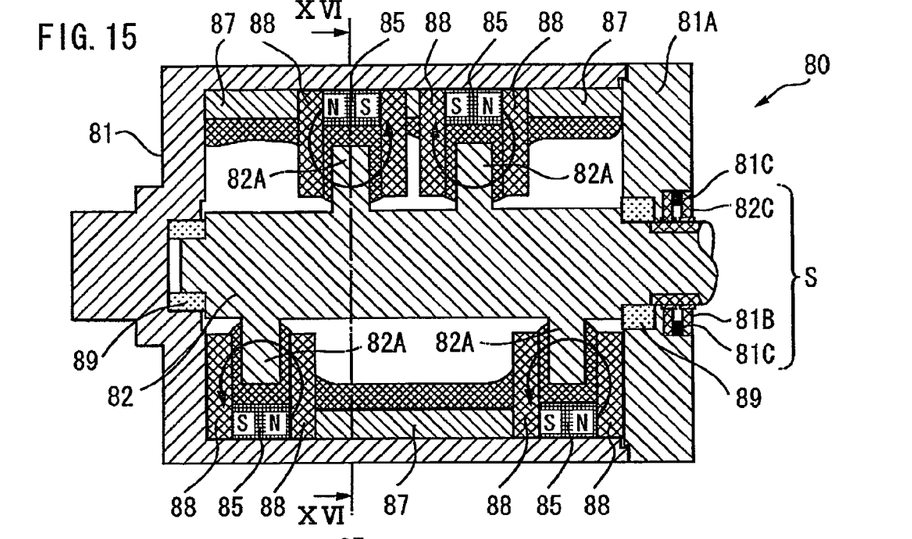
FIG. 15 is a cross-sectional view taken along an axis of an output shaft in a pulse torque generator according to a seventh embodiment of the present invention, and showing a state where a pulse torque generation has been enabled.
Figures 16, 17:
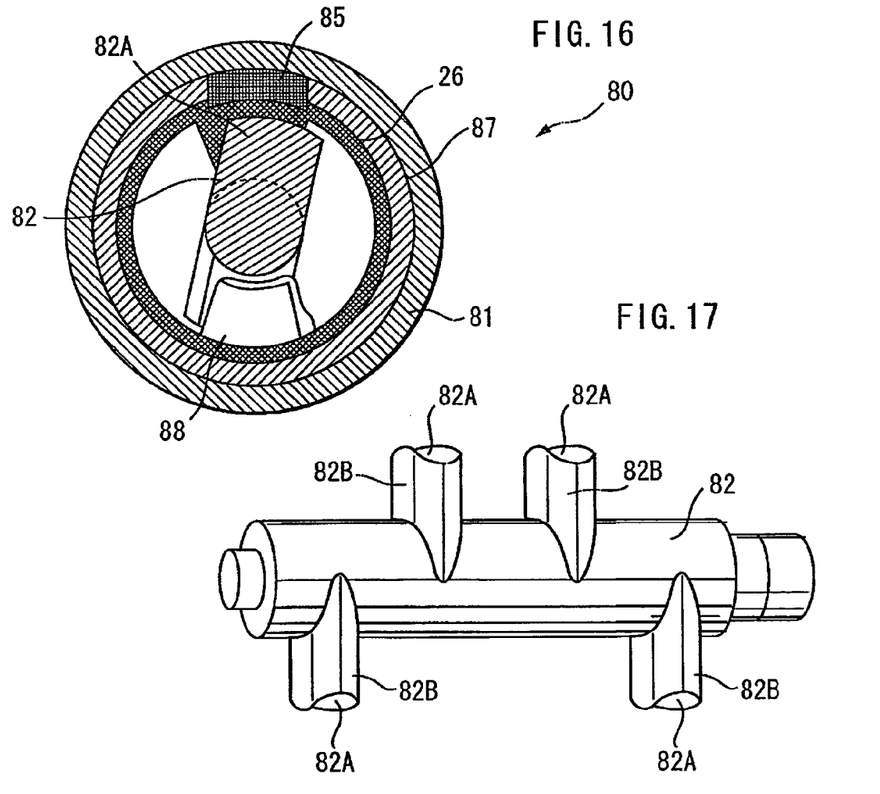
FIG. 16 is a cross-sectional view taken along the line XVII—XVII of FIG. 15.
FIG. 17 is a perspective view showing the output shaft in the seventh embodiment.

Four permanent magnets 85 and eight magnetic sections 88 serving as cores are disposed at the inner surface of the input shaft 81. Further, non-magnetic sections 87 serving as spacers are also disposed at the inner surface of the input shaft 81. One permanent magnet 85 is interposed between the two cores 88. Another permanent magnet 85 is also interposed between two cores 88, so that these are arrayed in an axial direction of the input shaft 81 through the non-magnetic sections 87. Another two sets of magnet 85 and two cores 88 are disposed at diametrically opposite side of the above-described first two sets, but first two sets and the other two sets are offset from each other in the axial direction. The cores 88 extend radially inwardly from the inner peripheral surface of the input shaft 81, so that a magnetic liquid receiving space is defined by the permanent magnet 85 and the two cores 88.

An output shaft 82 is rotatably supported by the input shaft 81 through bearings 89 and extends through the central opening of the end cap 81A. The output shaft 82 is provided with four protrusions 82A protruding radially outwardly from an outer surface of the output shaft 82 toward the inner surface of the input shaft 81. Each of the protrusions 82A is adapted to be passed between a space defined by the confronting two cores 88. The protrusions 82A provide a geometrical relationship such that all four protrusions 82A can be simultaneously entered into the associated space defied by the confronting two cores 88. Each protrusion 82A has a curved or tapered leading end surface and a trailing end surface 82B in the rotational direction, such that each leading end and the trailing end has the narrowest width as best shown in FIG. 17. With this arrangement, the tapered leading end 82B of the protrusion 82A can smoothly goes into the magnetic liquid 26 accumulated in the space between the confronting cores 88.

Figure 19:
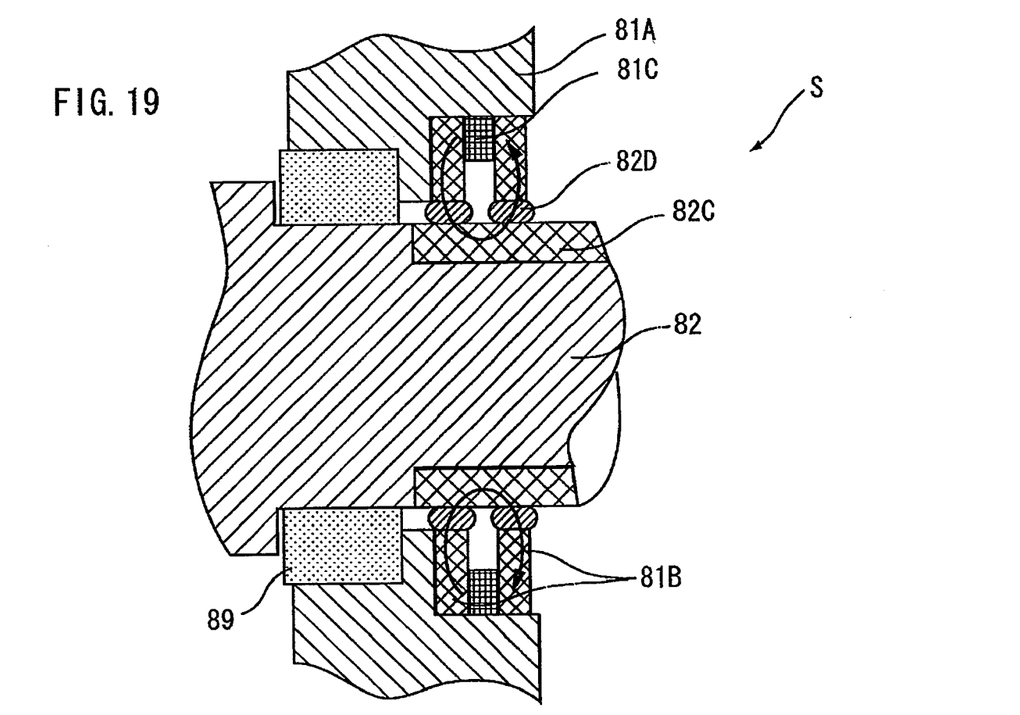
FIG. 19 is an enlarged cross-sectional view showing a configuration of a magnetic seal portion in the seventh embodiment.

The magnetic liquid 16 can be encapsulated within the input shaft 81 by a magnetic sealing arrangement S as best shown in FIG. 19. A magnetic seal arrangement S is adapted for preventing the leakage of the magnetic liquid 26 through the opening of the end cap 81A at the portion outside the bearing 89. As shown in FIG. 19, the magnetic seal arrangement S includes a magnetic sleeve portion 82C, two magnetic discs 81B, a permanent magnet 81C, and magnetic liquid 82D. The magnetic sleeve portion 82C is fitted to the outer peripheral surface of the output shaft 82 at a position outside of the bearing 89. Two magnetic discs 81B are disposed to the opening of the end cap 81A. The permanent magnet 81C is disposed to the opening of the end cap 81A and provided between the two magnetic discs 81B. The magnetic liquid 82D is interposed between the magnetic discs 81B and the magnetic sleeve portion 82C.

Figure 18:
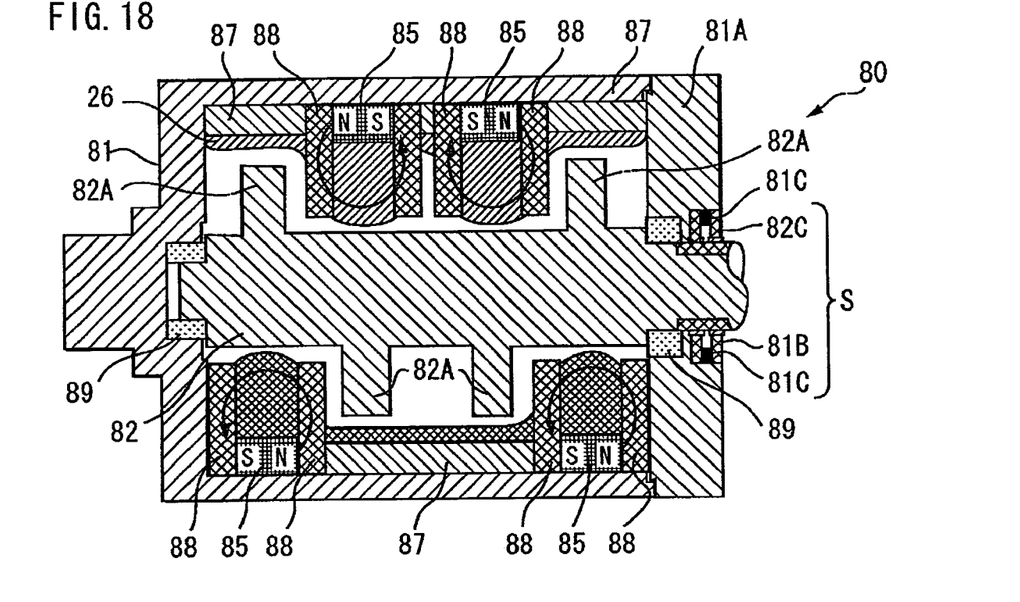
FIG. 18 is a cross-sectional view showing the pulse torque generator according to the seventh embodiment, and showing a state where a torque is not generated.

FIG. 18 shows a state where each of the protrusions 82A does not exist between the cores 88 and 88. In this case, the magnetic liquid 26 is not bridged between the input shaft 81 and output shaft 82, so that the output shaft 82 is not rotated in spite of the rotation of the input shaft 81.

When the input shaft 313 is further angularly rotated and the state shown in FIG. 15 is achieved, the magnetic liquid 26 is bridged between the input shaft 81 and output shaft 82, so that the rotation of the input shaft 81 can be transmitted to the output shaft 82. That is, the output shaft 82 generates one torque peak in a pulse-like manner every time the input shaft 317 is rotated 360 degrees. In this case, the magnitude of the torque is four times as large as that in the case where one permanent magnet is employed.

Further, since the viscous force brought by the magnetic liquid 26 acts symmetrically with respect to the axis of the output shaft 82 because of the angular positional relationship among the protrusions 82A and the magnetic sections 88, a force imbalance in the radial direction does not occur, and no force act on the bearing 89. As a result, the radial vibration of the pulse torque generator 80 is reduced.

Further, if a pressure in the input shaft 81 is increased, air in the input shaft 81 urges the magnetic liquid 26 to leak out of the input shaft 81. However, in the present embodiment, the magnetic liquid 82D is trapped at a position between the magnetic discs 81B and magnetic sleeve portion 82C because of the magnetically attractive force by the permanent magnet 81C. Accordingly, only the air is passed through the magnetic seal arrangement S in the form of bubbles, whereas the magnetic liquid 26 in the input shaft 81 is not leaked outside the magnetic seal S. The degree of pressure change occurring inside the input shaft 81 is dependent on a size of a space between the magnetic sleeve portion 82C and magnetic discs 81B. If the size of the space is set to as large as about 2 mm, difference between the internal pressure of the input shaft 81 and an atmospheric pressure becomes small, so that the input shaft 81 can be satisfactorily sealed.

Figure 20:
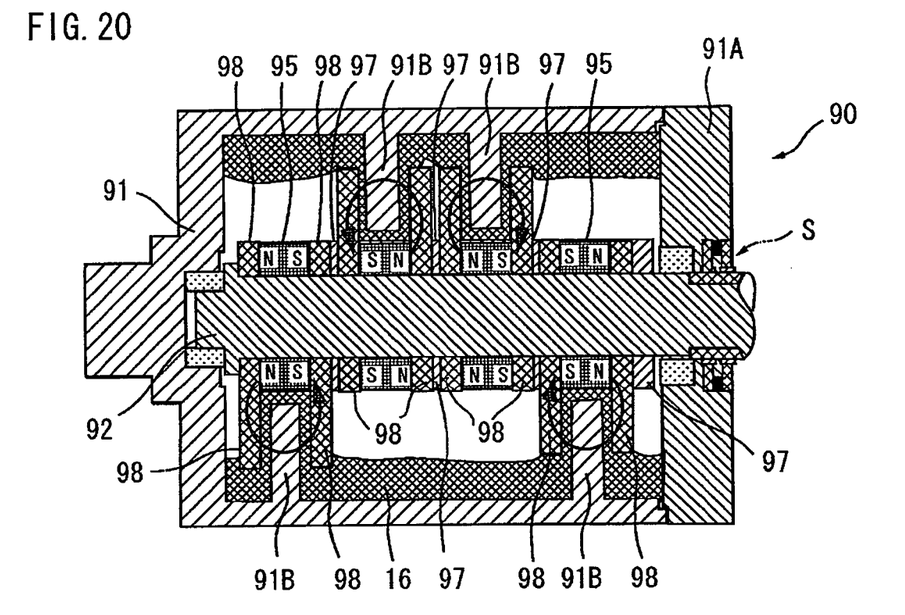
FIG. 20 is a cross-sectional view taken along an axis of an output shaft in a pulse torque generator according to an eighth embodiment of the present invention, and showing a state where a pulse torque generation has been enabled.
Figure 21:
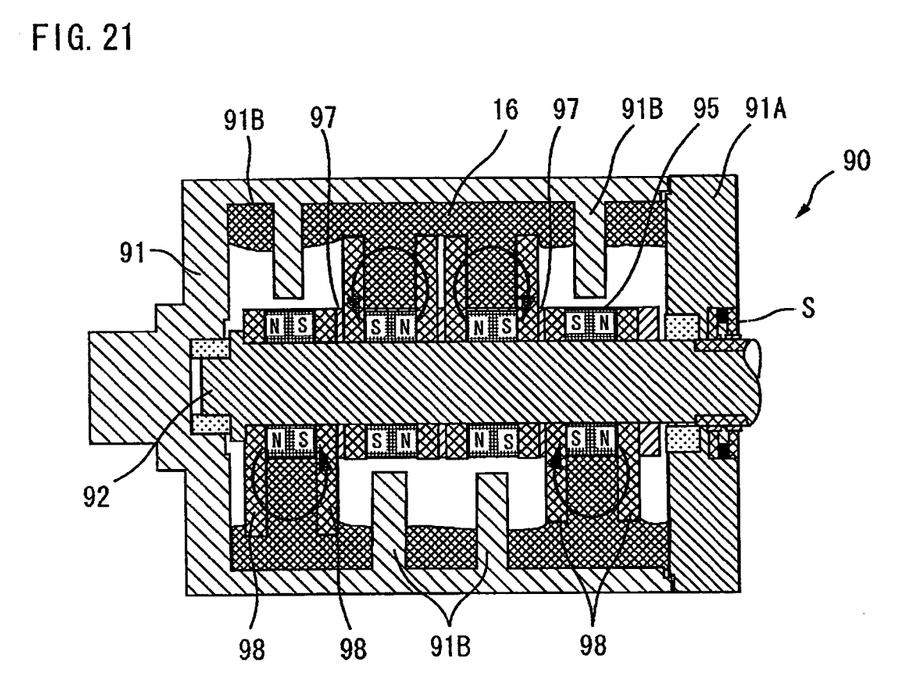
FIG. 21 is a cross-sectional view according to the eighth embodiment, and showing a state where a pulse torque is not generated.

A pulse torque generator according to an eighth embodiment of the present invention is shown in FIGS. 20 and 21. The eighth embodiment pertains to a modification to the seventh embodiment. That is, permanent magnets 95, non-magnetic sections 97, and magnetic section (cores) 98 are disposed at an outer peripheral surface of an output shaft 92, and protrusions 91B extend radially inwardly from the inner peripheral surface of an input shaft 91. Similar to the seventh embodiment, each protrusions 91B are adapted to be entered into each space defined between confronting cores 98 and 98 interposing therebetween each permanent magnet 95. Reference numeral 91A designates an end cap. Similar to the seventh embodiment, the magnetic seal arrangement S is provided. With this arrangement, a pulse torque is generated in the same manner as in the seventh embodiment.

Figure 22:
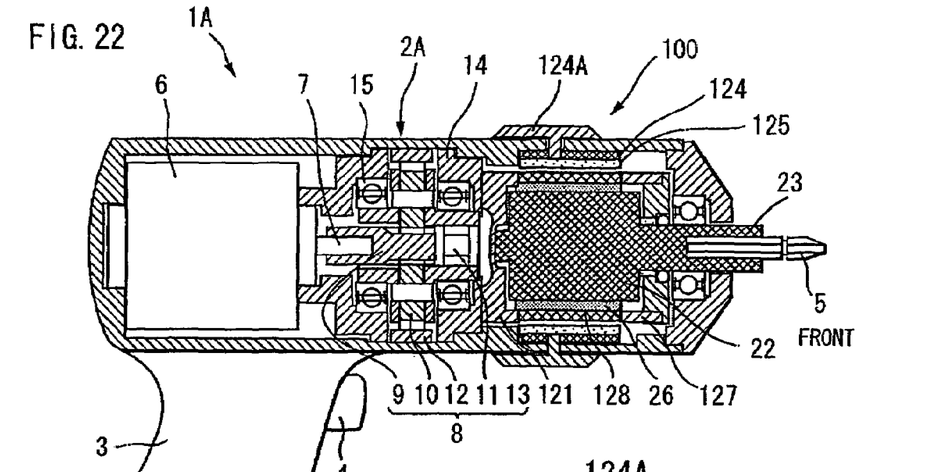
FIG. 22 is a cross-sectional view showing an impact driver incorporating a pulse torque generator according to a ninth embodiment of the present invention.
Figure 23:
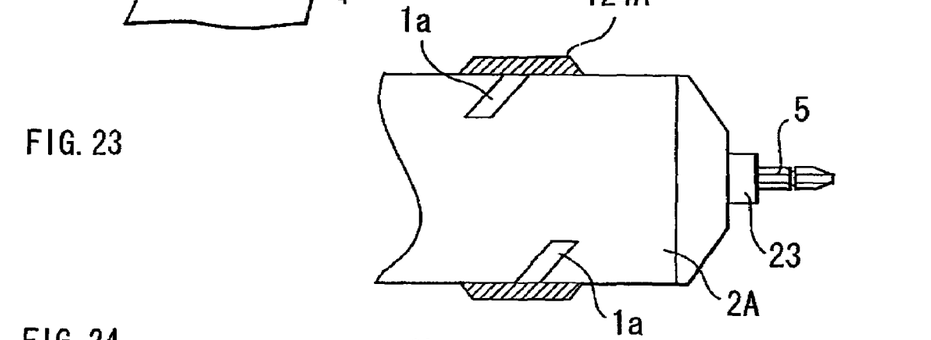
FIG. 23 is a side view showing a relationship between a slider and a slide groove in the ninth embodiment.
Figure 24:
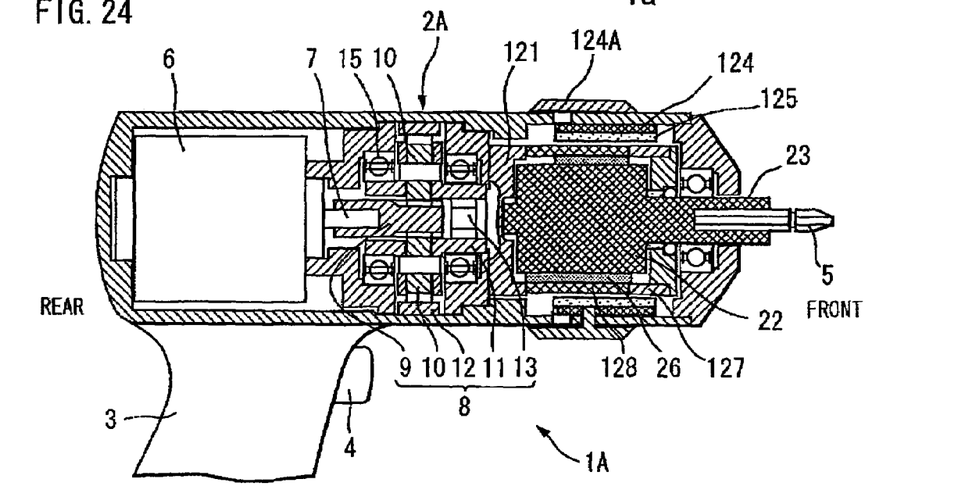
FIG. 24 is a cross-sectional view showing the impact driver of FIG. 22 and showing a state where a permanent magnet is moved ahead.

An impact driver incorporating a pulse torque generator according to a ninth embodiment of the present invention is shown in FIGS. 22 through 24. The ninth embodiment pertains to a modification to the first embodiment.

The configuration of this pulse torque generator 100 constituted by an input shaft 121, the output shaft 22, and the like is similar to that shown in FIGS. 1 and 2 except that an outer sleeve 124 and permanent magnets 125 can be moved in the axial direction of the input shaft 121. To this effect, a casing 1A is formed with a spiral guide slot 1a, and an annular slider 124A is disposed over the casing 1A. The annular slider 124A is slidably engaged with the guide slot 1a so as to be movable relative to the guide slot 1a. The outer sleeve 124 is connected to the slider 124. By the rotation of the annular slider 124, the slider 124 is moved in the axial direction of the input shaft 121, so that the outer sleeve 124 and the permanent magnets 125 are also moved in the axial direction of the input shaft 121.

By the movement of the permanent magnets 125 in the axial direction of the input shaft 121, mutually confronting area between the permanent magnets 125 and the magnetic sections 128 are changed. For example, in a state shown in FIG. 22, an entire area of the permanent magnets 125 are in confrontation with an entire area of the magnetic sections 128, whereas in a state shown in FIG. 24, mutually confronting area therebetween is reduced.

By moving the outer sleeve 124 and permanent magnets 125 in the axial direction of the input shaft 121, magnitude of the pulse torque that the output shaft 22 generates can be controlled. That is, as shown in FIG. 24, when the permanent magnets 125 is moved toward the front side of the impact driver 1A, the magnitude of the pulse torque to be generated becomes small.

While the invention has been described with reference to the specific embodiments thereof, it would be apparent to those skilled in the art that various changes and modification may be made without departing from the spirit and scope of the invention. For example, in the above-described embodiments, viscous force of the magnetic liquid 26 as a magnetic fluid is utilized to generate pulse torque. Alternatively, however, a fine magnetic powder can be used as a magnetic fluid in place of the magnetic liquid. In this case, the magnetic power is moved in the cavity of the input shaft by a magnetic force to allow the rotation of the input shaft to be transmitted to the output shaft through the magnetic powder, thereby generating a pulse torque using a reaction force generated by the magnetic powder. The magnetic powder can be used in the same manner as that in which the magnetic liquid 26 is used.

What is claimed is:

1. A pulse torque generator comprising:
    an input shaft having an axis and an inner peripheral surface, the input shaft being connected to a drive source and rotatable about the axis, the input shaft being provided with a hollow section extending in an axial direction of the input shaft and including at least one magnetic section and at least one non magnetic section, the hollow section providing a hollow space;
    an output shaft rotatably extending through the hollow space and having an outer peripheral surface, an annular gap being defined between the inner peripheral surface and the outer peripheral surface;
    a magnetic fluid encapsulated in the annular gap; and
    at least one magnetic field generating unit disposed at a radially outside of the hollow section, the magnetic section and the non-magnetic section being alternately confrontable with the magnetic field generating unit by the rotation of the input shaft, the magnetic fluid providing a magnetic bridge bridging between the input shaft and the output shaft each time the magnetic section is brought into confrontation with the magnetic field generating unit for pulsatingly transmitting rotation of the input shaft to the output shaft through the magnetic fluid bridge.

2. The pulse torque generator as claimed in claim 1, wherein the magnetic field generating unit comprises a permanent magnet.

3. The pulse torque generator as claimed in claim 1, wherein the magnetic field generating unit comprises an electromagnet.

4. The pulse torque generator as claimed in claim 3, wherein the electromagnet includes a coil, and the pulse torque generator further comprising a sensor that detects an angular rotational position of the input shaft so as to excite the coil in timed relation to the detection.

5. The pulse torque generator as claimed in claim 1, wherein at least two magnetic sections are provided in the input shaft at a diametrically opposite positions with respect to the axis, and at least two magnetic field generating units are provided at a diametrically opposite positions with respect to the axis.

6. The pulse torque generator as claimed in claim 1, wherein the magnetic field generating unit is movable in the axial direction of the input shaft for changing mutually confronting area between the magnetic field generating unit and the magnetic section.

7. The pulse torque generator as claimed in claim 1, wherein the magnetic section has an inner surface partly defining the inner peripheral surface of the input shaft, the inner surface being provided with a plurality of protrusions protruding radially inwardly toward the output shaft and a plurality of recesses alternate with the plurality of protrusions.

8. The pulse torque generator as claimed in claim 7, wherein the outer peripheral surface of the output shaft is provided with a plurality of protrusions protruding radially outwardly toward the inner peripheral surface of the input shaft.

9. The pulse torque generator as claimed in claim 1, wherein the outer peripheral surface of the output shaft is provided with a plurality of protrusions protruding radially outwardly toward the inner peripheral surface of the input shaft.

10. The pulse torque generator as claimed in claim 1, further comprising an outer sleeve concentrically disposed over the hollow section and having an inner peripheral surface, the magnetic field generating unit being attached to the inner peripheral surface of the outer sleeve.

11. A power tool comprising:
    a casing;
    a drive source disposed in the casing;
    an input shaft disposed in the casing and connected to the drive source and having an axis and an inner peripheral surface, the input shaft being rotatable about the axis, the input shaft being provided with a hollow section extending in an axial direction of the input shaft and including at least one magnetic section and at least one non magnetic section, the hollow section providing a hollow space;
    an output shaft rotatably extending through the hollow space and having an outer peripheral surface and a tip end to which an end tool is attachable, an annular gap being defined between the inner peripheral surface and the outer peripheral surface;
    a magnetic fluid encapsulated in the annular gap; and at least one magnetic field generating unit disposed at a radially outside of the hollow section, the magnetic section and the non-magnetic section being alternately confrontable with the magnetic field generating unit by the rotation of the input shaft, the magnetic fluid providing a magnetic bridge bridging between the input shaft and the output shaft each time the magnetic section is brought into confrontation with the magnetic field generating unit for pulsatingly transmitting rotation of the input shaft to the output shaft through the magnetic fluid bridge.

12. The power tool as claimed in claim 11, wherein the magnetic field generating unit is supported to the casing and is movable in the axial direction.

13. The power tool as claimed in claim 12, wherein the casing is formed with a guide slot, and the power tool further comprising:

an outer sleeve disposed within the casing and concentrically disposed over the hollow section and having an inner peripheral surface, the magnetic field generating unit being attached to the inner peripheral surface of the outer sleeve; and a slider disposed over the casing and engaged with the guide slot, the slider being connected to the outer sleeve.

14. A pulse torque generator comprising:

an input shaft having an axis and an inner peripheral surface, the input shaft being connected to a drive source and rotatable about the axis, the input shaft being provided with a hollow section extending in an axial direction of the input shaft, the hollow section providing a hollow space;

an output shaft rotatably extending through the hollow space and having an outer peripheral surface, an annular gap being defined between the inner peripheral surface and the outer peripheral surface;

a magnetic fluid encapsulated in the annular gap;

at least one magnetic field generating unit disposed at one of the inner peripheral surface of the input shaft and the outer peripheral surface of the output shaft; and at least one pair of magnetic members disposed to interpose the at least one magnetic field generating unit between the pair of magnetic members, the magnetic fluid providing a magnetic bridge bridging between the input shaft and the output shaft each time a distance between the input shaft and the output shaft becomes minimum for pulsatingly transmitting rotation of the input shaft to the output shaft through the magnetic fluid bridge.

15. The pulse torque generator as claimed in claim 14, wherein the pair of magnetic members and the at least one magnetic members are arranged in a circumferential direction of the hollow section, and wherein the output shaft has a pair of arcute surfaces symmetrically positioned with respect to the axis, and a pair of flat surfaces symmetrically positioned with respect to the axis and angularly offset by 90 degrees from the arcuate surfaces, the minimum distance being provided when the magnetic member is brought into confrontation with the arcuate surface.

16. The pulse torque generator as claimed in claim 14, wherein the at least one pair of magnetic members are disposed to provide a predetermined space defined therebetween, the pair of magnetic members radially extending from one of the inner peripheral surface of the input shaft and the outer peripheral surface of the output shaft; and the pulse torque generator further comprises at least one protrusion extending from remaining one of the outer peripheral surface of the output shaft and the inner peripheral surface of the input shaft, the protrusion being disposable within the predetermined space to provide the minimum distance, the magnetic fluid providing a magnetic bridge bridging between the protrusion and the pair of magnetic members each time the protrusion passes through the predetermined space for pulsatingly transmitting rotation of the input shaft to the output shaft through the magnetic fluid bridge.

17. The pulse torque generator as claimed in claim 16, wherein at least two magnetic field generating units are provided at diametrically opposite sides with respect to the axis, and wherein at least two pairs of magnetic members are provided at diametrically opposite side with respect to the axis, and wherein at least two protrusions are provided at diametrically opposite side with respect to the axis at positions capable of allowing the at least two protrusions to be simultaneously entered into the predetermined spaces.

18. A power tool comprising:

a casing;

a drive source disposed in the casing;

an input shaft disposed in the casing and having an axis and an inner peripheral surface, the input shaft being connected to the drive source and rotatable about the axis, the input shaft being provided with a hollow section extending in an axial direction of the input shaft, the hollow section providing a hollow space;

an output shaft rotatably extending through the hollow space and having an outer peripheral surface and a tip end to which an end tool is attachable, an annular gap being defined between the inner peripheral surface and the outer peripheral surface;

a magnetic fluid encapsulated in the annular gap;

at least one magnetic field generating unit disposed at one of the inner peripheral surface of the input shaft and the outer peripheral surface of the output shaft; and at least one pair of magnetic members disposed to interpose the at least one magnetic field generating unit between the pair of magnetic members, the magnetic fluid providing a magnetic bridge bridging between the input shaft and the output shaft each time a distance between the input shaft and the output shaft becomes minimum for pulsatingly transmitting rotation of the input shaft to the output shaft through the magnetic fluid bridge.

19. The power tool as claimed in claim 18, wherein the at least one pair of magnetic members are disposed to provide a predetermined space defined therebetween, the pair of magnetic members radially extending from one of the inner peripheral surface of the input shaft and the outer peripheral surface of the output shaft; and the pulse torque generator further comprises at least one protrusion extending from remaining one of the outer peripheral surface of the output shaft and the inner peripheral surface of the input shaft, the protrusion being disposable within the predetermined space to provide the minimum distance, the magnetic fluid providing a magnetic bridge bridging between the protrusion and the pair of magnetic members each time the protrusion passes through the predetermined space for pulsatingly transmitting rotation of the input shaft to the output shaft through the magnetic fluid bridge.

20. The power tool as claimed in claim 19, wherein at least two magnetic field generating units are provided at diametrically opposite sides with respect to the axis, and
wherein at least two pairs of magnetic members are provided at diametrically opposite side with respect to the axis, and
wherein at least two protrusions are provided at diametrically opposite side with respect to the axis at positions capable of allowing the at least two protrusions to be simultaneously entered into the predetermined spaces.

* * * * *